(12) United States Patent
Kumar et al.

(10) Patent No.: US 8,433,784 B2
(45) Date of Patent: Apr. 30, 2013

(54) TRAFFIC GENERATOR WITH ENHANCED BURST MODELING FEATURE

(75) Inventors: Vinoj N. Kumar, Austin, TX (US); Kaushik Nath, Bangalore (IN)

(73) Assignee: Agere Systems LLC, Allentown, PA (US)

(*) Notice: Subject to any disclaimer, the term of this patent is extended or adjusted under 35 U.S.C. 154(b) by 1996 days.

(21) Appl. No.: 10/620,258

(22) Filed: Jul. 15, 2003

(65) Prior Publication Data

US 2005/0027503 A1 Feb. 3, 2005

(51) Int. Cl.
*G06F 15/16* (2006.01)
*G06F 17/50* (2006.01)

(52) U.S. Cl.
USPC .............................. 709/224; 703/19; 709/223

(58) Field of Classification Search .......... 709/223–224; 703/21, 13, 19, 20; 370/230, 230.1, 231, 370/232, 241, 247, 252
See application file for complete search history.

(56) References Cited

U.S. PATENT DOCUMENTS

| | | | | |
|---|---|---|---|---|
| 6,028,847 | A * | 2/2000 | Beanland | 370/252 |
| 6,950,405 | B2 * | 9/2005 | Van Gerrevink | 370/252 |
| 7,013,255 | B1 * | 3/2006 | Smith, II | 703/21 |
| 2003/0033406 | A1 * | 2/2003 | John et al. | 709/224 |

OTHER PUBLICATIONS

Kim, C;Choi, D.; Park, H.;"On the design and implementation of an ATM traffic emulator"; TECON '93. Proceedings. Computer, Communication, Control and Power IEEE Region 10 COnference on; Issue 0, Part 3000019-21 Oct. 1993 pp. 274-278 vol. 3; [retrieved on Jul. 13, 2006 from IEEE Database].*

Chu, P.;"ATM burst traffic generator"; VLSI 1995. Proceedings., Fifth Great Lakes Symposium on; Mar. 16-18, 1995 pp. 262-265. [retrieved on Jul. 13, 2006 from IEEE Database].*

Hontas, S.; Tselikis, G.;Tompros, S.;Giamniadakis, J.;Loukatos, D.;Mitrou, N.;"ATM traffic generator card. An integrated solution". Computers and Communications, 1998. ISCC '98. Proceedings. Third IEEE Symposium. Jun. 30-Jul. 2, 1998 pp. 161-165. [retrieved on Jul 13, 2006 from IEEE Database].*

Hontas, S.; Tselikis, G.;Tompros, S.;Giamniadakis, J.;Loukatos, D.;Mitrou, N.;"ATM traffic generator card. An integrated solution". Computers and Communications, 1998. ISCC '98. Proceedings. Third IEEE Symposium. Jun. 30-Jul. 2, 1998 pp. 161-165. [retrieved on Jul. 13, 2006 from IEEE Database].*

Bae, J.J.; Suda, T.;"Survey of traffic control schemes and protocols in ATM networks".Proceedings of the IEEE vol. 79, Issue 2, Feb. 1991 pp. 170-189-[retreived from IEEE database on Apr. 30, 2008].*

(Continued)

*Primary Examiner* — Saleh Najjar
*Assistant Examiner* — Lashanya Nash
(74) *Attorney, Agent, or Firm* — Ryan, Mason & Lewis, LLP

(57) ABSTRACT

A traffic generator is disclosed which generates a first type of traffic in accordance with a given distribution, and generates a second type of traffic that includes at least one traffic burst. The traffic burst is generated based at least in part on an amount of the first type of traffic generated over one or more time intervals. For example, in an illustrative embodiment, generation of the second type of traffic involves accumulating traffic over one or more of the time intervals for which the first type of traffic is generated, and generating the traffic burst based at least in part on the accumulated traffic.

20 Claims, 3 Drawing Sheets

OTHER PUBLICATIONS

X. Yu, Y. Chen, and C. Qiao, "Study of traffic statistics of assembled burst traffic in optical burst switched networks", Proc. Opticomm, pp. 149-159 2002. [retrieved from Internet "http://www.icsd.aegean.gr/postgraduates/gkaram/2002/Ref.54-Yu.pdf" on Aug. 12, 2012].*

W.E. Leland, "On the Self-Similar Nature of Ethernet Traffic," IEEE/ACM Transactions on Networking, pp. 1-46, Feb. 1994.

R. Bhattacharya et al., "Design of 160 Gbps Router with PI40 Switch Fabric and 10G Chipsets," Proceedings of the International Conference on Communcations and Broadband Networking, ICBN '03, May 5-7, 2003, Bangalore, India, 4 pages, 2003.

D. Turner et al., "Protocol-Dependent Message-Passing Performance on Linux Clusters," 2002 IEEE International Conference on Cluster Computing (CLUSTER 2002), Chicago, IL, USA, pp. 187-194, Sep. 23-26, 2002.

NetPIPE, http://www.scl.ameslab.gov/netpipe/, pp. 1-2, May 2003.

"Welcome to the Public Netperf Homepage," http://www.netperf.org/netperf/NetperfPage.html, 1 page, Nov. 2003.

TTCP Utility, "Test TCP (TTCP) Benchmarking Tool for Measuring TCP and UDP Performance," http://www.pcausa.com/Utilities/pcattcp.htm, pp. 1-5, Feb. 2003.

* cited by examiner

TRAFFIC GENERATOR WITH ENHANCED BURST MODELING FEATURE

RELATED APPLICATION(S)

The present invention is related to the invention described in U.S. patent application Ser. No. 10/620,044, entitled "Extensible Traffic Generator for Synthesis of Network Data Traffic," which is filed concurrently herewith and incorporated by reference herein.

FIELD OF THE INVENTION

The present invention relates generally to communication systems, and more particularly to techniques for generating data traffic for use in testing or other processing applications in such systems.

BACKGROUND OF THE INVENTION

Traffic generators are commonly utilized in generating data traffic having characteristics suitable for testing a given communication system design. Such traffic generators may be implemented in hardware or software. Data traffic characteristics such as the time distribution of packet arrival are critical for testing communication system performance parameters such as buffering and scheduling capacity. It is generally desirable for the traffic generator to provide data traffic output which closely models the "real-life" behavior of packet arrival timing in the system. For example, such behavior often involves so-called burst arrival, when a certain number of packets arrive substantially back-to-back, that is, one after another without any significant intervening time between arriving packets.

In order to provide proper stress testing of the components of a communication system, in a system design phase or otherwise, a traffic generator should incorporate an efficient and accurate burst model. Unfortunately, conventional traffic generators typically utilize burst techniques, such as constant burst or probabilistic burst, that fail to provide adequate levels of efficiency and accuracy. As a result, such traffic generators do not provide sufficiently close modeling of "real-life" packet arrival behavior in a communication system.

Although other burst modeling techniques are known in the context of queuing theory, such techniques are often not readily applicable for use in practical hardware or software traffic generators. One such technique is the Hurst parameter, which has been used to describe burst behavior in theoretical network traffic description as well as in predicting natural burst events such as floods. Additional details can be found in, for example, W. Stallings, "High Speed Networks and Internets: Performance and Quality of Service," Chapter 9, and W. E. Leland, "On the Self-Similar Nature of Ethernet Traffic," IEEE/ACM Transactions on Networking, February 1994. However, the Hurst parameter is mathematically very complex, and therefore difficult to understand and formulate. In addition, it exhibits a computational complexity which makes it highly impractical to implement in a hardware or software traffic generator.

Accordingly, a need exists in the art for a traffic generator which provides improved modeling of burst arrival, in a manner that overcomes the disadvantages of the conventional techniques noted above.

SUMMARY OF THE INVENTION

The present invention provides a traffic generator having an enhanced burst modeling feature based on what is referred to herein as a compensatory burst model.

In accordance with one aspect of the invention, a traffic generator generates a first type of traffic in accordance with a given distribution, and generates a second type of traffic that includes at least one traffic burst. The traffic burst is generated based at least in part on an amount of the first type of traffic generated over one or more time intervals.

By way of example, in an illustrative embodiment, generation of the second type of traffic involves accumulating traffic over one or more of the time intervals for which the first type of traffic is generated, and generating the traffic burst based at least in part on the accumulated traffic. More specifically, the second type of traffic may comprise a plurality of traffic bursts, with a given one of the traffic bursts being generated by determining a current burst size and a current compensatory-accumulation size, creating an initially-empty burst container having a capacity that is equal to the burst size, adding compensatory traffic to the burst container whenever the total traffic of the first type generated within a given sample slot time is less than a comparison level, such that for each such addition of compensatory traffic, a level of traffic in the burst container increases by the compensatory-accumulation size, and generating the given traffic burst when the burst container level is greater than or equal to the burst size.

Advantageously, the compensatory burst model generates traffic bursts in a manner which tends to compensate for temporary reductions in the amount of traffic of the first type, so as to substantially maintain a desired level of traffic flow.

DETAILED DESCRIPTION OF THE INVENTION

The present invention will be illustrated herein using an exemplary traffic generator providing an enhanced burst modeling feature. It should be understood, however, that the techniques of the invention can be more generally applied to any type of traffic generation application. The invention does not require the particular elements of the illustrative embodiment, and other elements can be used in addition to or in place of the particular elements shown.

Figure 1:
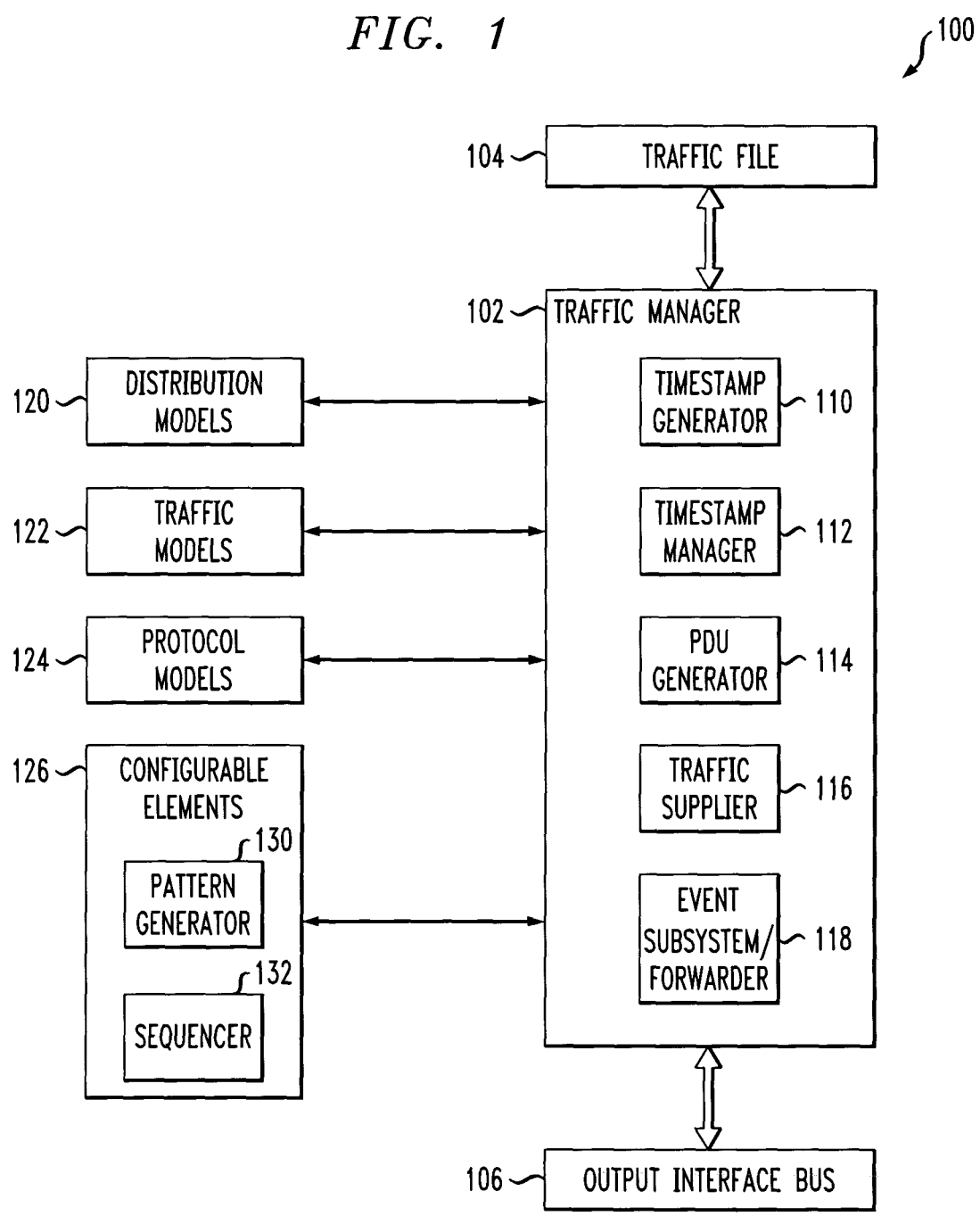
FIG. 1 shows an illustrative embodiment of a traffic generator configured in accordance with the invention.

FIG. 1 shows an illustrative embodiment of a traffic generator 100 configured in accordance with the invention. The traffic generator 100 includes a traffic manager 102, a traffic file memory 104, and an output interface bus 106.

The traffic manager 102 manages the traffic generation functions of the traffic generator 100, and includes in this embodiment a timestamp generator 110, a timestamp manager 112, a protocol data unit (PDU) generator 114, a traffic supplier 116, and an event subsystem and/or forwarder 118. Generated traffic patterns, parameters and other traffic-related information are stored in the traffic file memory 104. Traffic generated by the traffic generator 100 under the control of the traffic manager 102 may be delivered via output interface bus 106 to one or more devices.

In generating traffic using the techniques described herein, the traffic manager 102 may also utilize distribution models 120, traffic models 122, protocol models 124, and configurable elements 126. Examples of configurable elements include a pattern generator 130 and a sequencer 132.

Additional details regarding the operation of one or more of the modules or other elements of the traffic generator 100 may be found in the above-cited U.S. patent application Ser. No. 10/620,044.

The traffic generator 100 or other traffic generator configured in accordance with the invention can be implemented in hardware, software, firmware or any combination of these. For example, the traffic generator 100 may be viewed as a hardware traffic generator or a software traffic generator, or a combination of both. Generally, the traffic generator 100, whether implemented as a hardware traffic generator, a software traffic generator or a combination of both, may be implemented as or within an information processing device having at least one processor and at least one associated memory.

A more particular example of a software traffic generator is a software traffic generator which comprises an element of a software-based development tool for simulating the operation of interconnected integrated circuits or other types of electronic systems. Such a software-based development tool is typically configured to run at least in part on a general-purpose computer, workstation or other information processing device comprising at least one processor and an associated memory.

The traffic generator 100 is configured to execute one or more traffic generation processes, as will be described in greater detail below in conjunction with FIGS. 2 and 3. Such processes are implemented at least in part in the form of software comprising one or more programs stored in the memory of the information processing device and executed by the processor of the information processing device. The configuration and operation of such information processing devices are well-known in the art, and therefore not described in further detail herein.

It is also to be appreciated that the traffic generator 100 in the illustrative embodiment may further include, in addition to or in place of the particular modules or other elements shown in FIG. 1, additional modules and other elements of a type commonly found in conventional implementations of such traffic generators. These conventional modules and other elements, being commonly used in the art, will not be described in detail herein.

The present invention in accordance with one aspect thereof provides improved techniques for burst modeling in a traffic generator. The techniques can be utilized in generating packet bursts or other bursts of data traffic. For example, the techniques can be used to model the behavior of file transfer protocol (FTP) traffic experienced by a network server in a network-based communication system, and in numerous other traffic modeling applications.

The particular burst model utilized in the illustrative embodiment may be stored in the set of traffic models 122, and utilized by the traffic manager 102 to generate the corresponding traffic in the manner described herein.

It is to be appreciated that, although described in the context of network traffic arrival, the burst modeling techniques of the invention can be applied to a wide variety of other traffic generation applications. Also, the invention does not require the use of packet-based traffic or any other particular data traffic format.

In a generalized queuing system, inter-arrival time between two consecutive queue elements follows a certain probabilistic distribution, which may be used to model the operation of the system. Similarly, the data traffic that arrives at a given node in a network-based communication system may also be observed to follow a probabilistic distribution taken from queuing theory. An example of one such probabilistic distribution is the well-known Poisson distribution. Assuming that the sequence of inter-arrival times between consecutive queue elements is represented by $\{A1, A2, A3 \ldots Ak\}$, then the arrival process in the corresponding queuing system is said to follow a Poisson distribution if the following holds:

1. Arrivals occur one at a time.
2. The distribution of the number of arrivals between time t and time t+s depends only on the length of the interval s and not on the starting time t.
3. The variable that represent the interarrival time, i.e., the variable that takes one value from the sequence $\{A1, A2, A3 \ldots Ak\}$, is an independent random variable.
4. The probability that $Ai$, $i=1, 2, \ldots k$, is less than or equal to t, is given by $(1-\exp(-\lambda t))$, where $\lambda$ is the average rate of arrivals per unit time.

Burst arrival occurs in the generalized queuing system when there is no time difference between arrivals of elements of the queue. As indicated previously, in the data traffic context, burst arrivals generally correspond to back-to-back packet arrivals. Conventional techniques are unable to provide efficient and accurate modeling of such a condition, in a manner suitable for use in a hardware or software traffic generator.

The illustrative embodiment of the present invention provides an improved burst model referred to herein as the compensatory burst model. It should be noted that the compensatory burst model may be combined with other models that generate non-burst arrivals in order to achieve a desired traffic arrival pattern.

Utilizing the compensatory burst model of the illustrative embodiment, burst traffic may be viewed as being dependent at least in part on the normal course of packet arrivals. For example, if a certain time interval witnesses a shortage of packet arrivals, packet bursts may be viewed as eventually compensating the shortage, such that a particular level of packet flow is maintained over a longer period of time.

The compensatory burst model will now be described in greater detail with reference to the diagrams of FIGS. 2 and 3. The compensatory burst model is based at least in part on accumulating traffic over a given queuing process. More specifically, the model involves generating and monitoring a particular pattern of traffic referred to herein as "comparative traffic." Such traffic is generated in accordance with a specified normal traffic arrival process. When the total amount of comparative traffic that is generated within a specified time interval, referred to herein as a sample slot time, falls below a specified comparison level, a certain amount of burst traffic is accumulated in a burst container. The burst occurs when the total amount of accumulated burst traffic in the burst container reaches a specified burst size.

The term "burst container" as used herein is intended to include, by way of example and without limitation, a counter or other set of information stored in a specified location in a memory of an information processing device. The process of accumulating burst traffic by adding traffic to a burst container may be implemented by incrementing a counter or other set of information which characterizes the contents of a burst container. It should therefore be understood that references in the description of the illustrative embodiment to the accumulation of burst traffic or the addition of traffic to a container do not require the use of actual traffic per se, but can instead be implemented in a straightforward manner using conventional counters, data structures and/or associated processing logic.

In the illustrative embodiment, the comparative traffic may be generated so as to follow the above-described Poisson distribution. Other types of distributions may be used for generating the comparative traffic, including by way of example a Gaussian distribution or any other desired distribution, as will be readily appreciated by those skilled in the art. The comparative traffic may thus be generated using a given distribution which is itself a combination of multiple distributions.

It will be assumed for purposes of illustration that the compensatory burst model operates using a number of user-defined parameters. These parameters may include the following:

1. General information such as physical line capacity, total number of packets, etc.
2. The normal traffic arrival process to be taken as the comparative traffic.
3. The comparison level.
4. The mean burst size and its variation range.
5. The mean compensatory-accumulation size and its variation range.

These user-defined parameters are advantageous in terms of providing an exceptionally high degree of user control over burst generation. It should be understood, however, that the invention does not require the use of these particular parameters, nor does it require that, if used, any of these parameters be user-defined. For example, one or more of these parameters may be predetermined, automatically computed, or determined using other techniques.

Figure 2A:
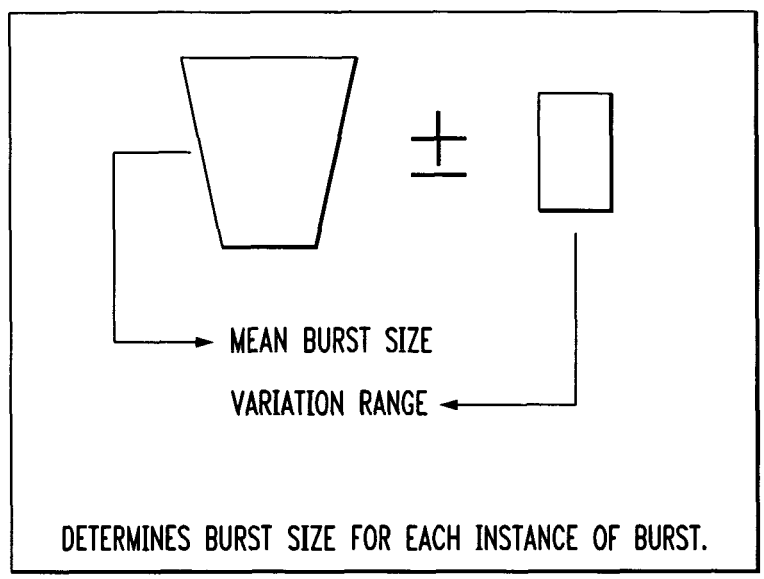
FIGS. 2A and 2B illustrate the determination of burst size and compensatory-accumulation size, respectively, in a traffic generation process in the traffic generator of FIG. 1.

With reference to FIG. 2A, it can be seen that the mean burst size and its specified variation range determine the current burst size for each burst. For each burst, the above-noted burst container has a capacity equal to the current burst size.

Figure 2B:
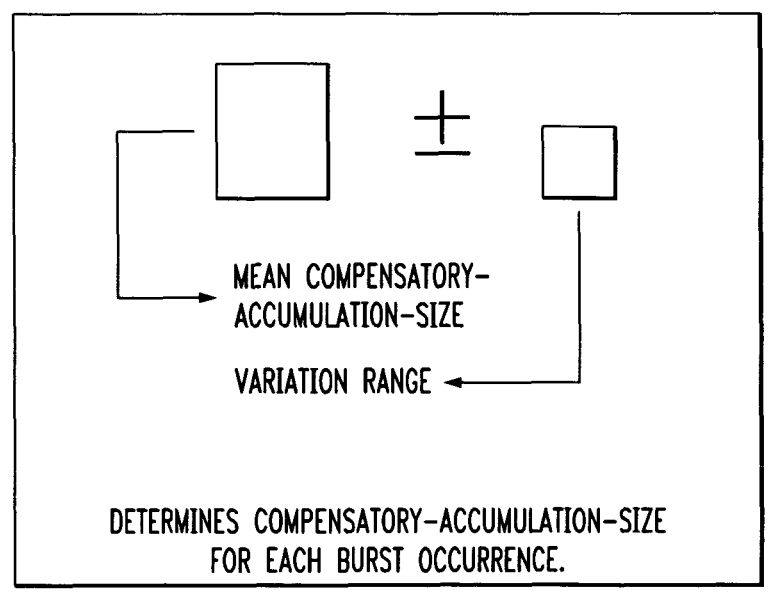

Similarly, FIG. 2B shows that the mean compensatory-accumulation size and its specified variation range determine the compensatory-accumulation size for each burst.

Figure 3:
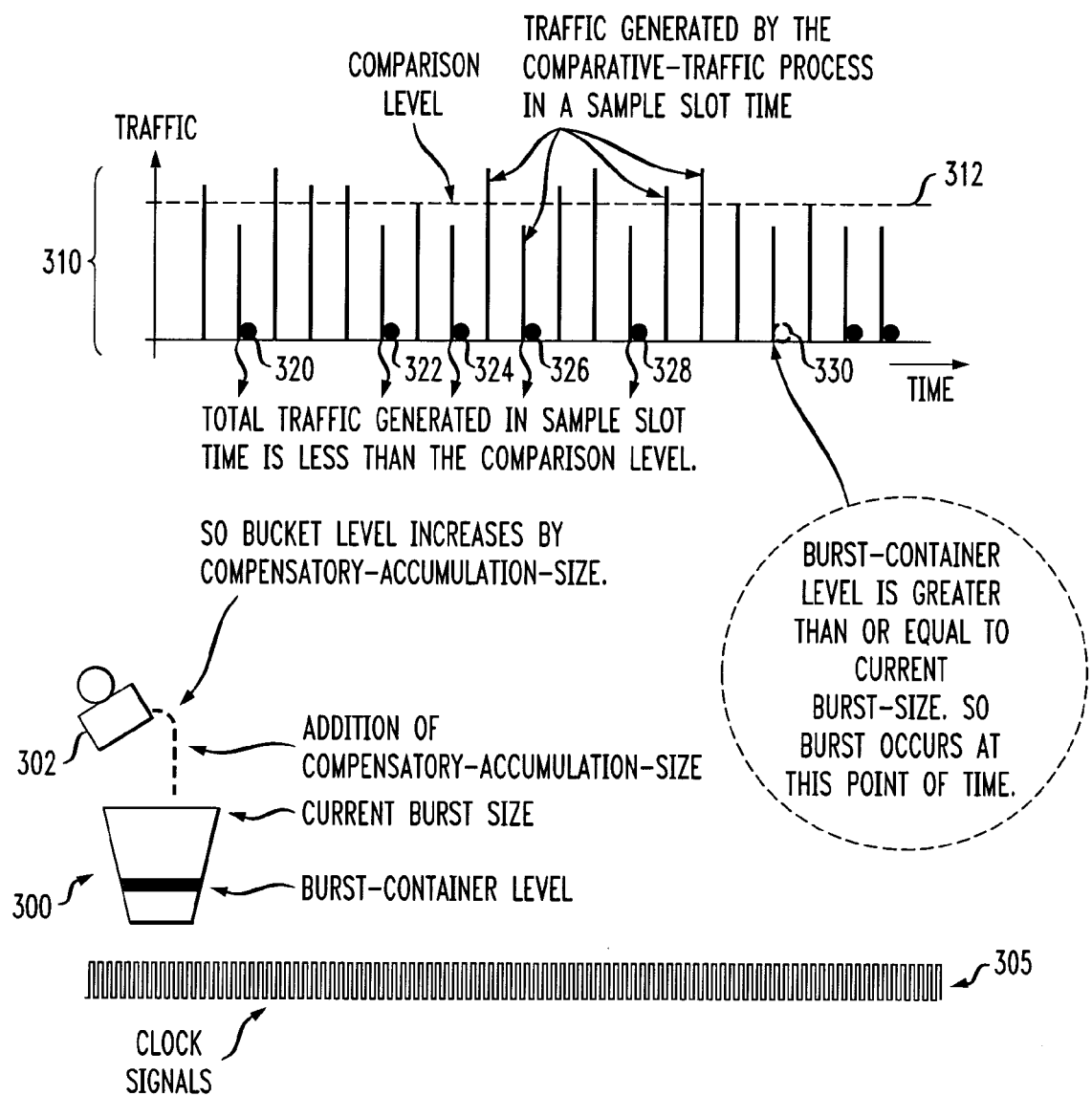
FIG. 3 shows an example traffic generation process implemented in the traffic generator of FIG. 1.

This compensatory-accumulation size is also referred to herein as a "mug" size, in that the compensatory burst model may be viewed as filling a given burst container 300 with a mug 302, as indicated in the diagram of FIG. 3. The burst container is also referred to herein as a "bucket" and has a capacity corresponding to the current burst size. Clock signals 305 used to control traffic generation are also shown in the diagram of FIG. 3.

With continued reference to FIG. 3, the graphical plot portion of the diagram indicated generally by 310 plots the total traffic generated in each of a plurality of sample slot times as a function of time. As indicated previously, the traffic may be generated utilizing clock signals 305. A comparison level 312 corresponding to a constant amount of traffic is also shown. The total traffic generated in a given sample slot time corresponds generally to one of the vertical lines plotted in the graphical plot portion 310. For each sample slot time for which the total traffic generated is less than the comparison level, the level of the burst container 300 is increased by the addition of an amount of traffic equal to the compensatory-accumulation size. As indicated previously, this is illustrated by the emptying of the contents of mug 302 into the burst container 300 as shown.

The sample slot times denoted generally by the solid circles 320, 322, 324, 326 and 328 denote sample slot times for which the amount of generated traffic is less than the comparison level, with each such sample slot time resulting in an increase in the contents of the burst container by an amount corresponding to the compensatory-accumulation size. The sample slot time denoted generally by the dashed circle 330 represents the sample time slot for which the burst container level becomes greater than or equal to the current burst size. The burst therefore occurs substantially at this point in time. The process of accumulating burst traffic in the burst container and subsequently generating a burst when the burst container level equals or exceeds the burst size then repeats itself indefinitely, for as long as this particular burst modeling is desired.

A given interval between two consecutive bursts in the illustrative embodiment is always a multiple of the sample slot time. A longer sample slot time will therefore result in longer intervals between consecutive bursts.

Other parameters, such as the comparison level, compensatory-accumulation size and burst size, also influence the interval between consecutive bursts. For example, the higher the comparison level, the longer the interval between consecutive bursts. Similarly, the larger the burst size, the longer the interval between consecutive bursts, and the larger the generated bursts. With regard to the compensatory-accumulation size, an increase in this size will shorten the interval between consecutive bursts, and vice-versa.

A more detailed example of a traffic generation process utilizing the compensatory burst model of the invention will now be described. It will be assumed that the comparative-traffic distribution is selected as a Poisson distribution, and that a fixed sample slot time and a fixed comparison level are used. The time instance at which a given traffic burst is generated is denoted in this example as $t_b$. The traffic generation process with compensatory burst modeling proceeds as follows.

At Time Instance (0):
  Burst size is determined.
  Compensatory-accumulation size is determined.
  An empty burst container is created having a capacity that is equal to the burst size.

At Time Instance (0+Sample Slot Time):
  The generated comparative traffic is compared with the comparison level. If the generated comparative traffic is less than the comparison level, an amount of compensatory traffic equal to the compensatory-accumulation size is added to the empty burst container, so that the current burst container level increases by the compensatory-accumulation size. No compensatory traffic is added to this burst container if the generated comparative traffic is greater than or equal to the comparison level. After addition of compensatory traffic to the burst container, the accumulation of compensatory traffic in the burst container is compared with the burst size. If the accumulated compensatory traffic is greater than or equal to the burst size, the burst is generated at a burst time $t_b$ which corresponds substantially to time instance (0+sample slot time). It will be assumed for this example that the result of this comparison of accumulated compensatory traffic with burst size indicates that the accumulated compensatory traffic is less than the burst size.

At Each of One or More Subsequent Time Instances (0+2* (Sample Slot Time)). (0+(n−1)* (Sample Slot Time)):
  The total comparative traffic generated between the current time instance and the immediately preceding time instance is compared with the comparison level. If the generated comparative traffic is less than the comparison level, an amount of compensatory traffic equal to the compensatory-accumulation size is added to the burst container, so that the current burst container level increases by the compensatory-accumulation size. No additional compensatory traffic is added to the burst container if the generated comparative traffic is greater than or equal to the comparison level. After addition of compensatory traffic to the burst container, the accumulation of compensatory traffic in the burst container is compared with the burst size. If the accumulated compensatory traffic is greater than or equal to the burst size, the burst is generated at a burst time $t_b$ which corresponds substantially to the current time instance. It will be assumed for this example that the result of this comparison of accumulated compensatory traffic with burst size indicates that the accumulated compensatory traffic is less than the burst size for each of the time instances (0+2*(sample slot time)), . . . (0+(n−1)*(sample slot time)).

At Time Instance (0+n*(Sample Slot Time)):

The total comparative traffic generated between the time instance (0+(n−1)*(sample slot time)) and the time instant (0+n*(sample slot time)) is compared with the comparison level. If the generated comparative traffic is less than the comparison level, an amount of compensatory traffic equal to the compensatory-accumulation size is added to the burst container, so that the current burst container level increases by the compensatory-accumulation size. No additional compensatory traffic is added to the burst container if the generated comparative traffic is greater than or equal to the comparison level. After addition of compensatory traffic to the burst container, the accumulation of compensatory traffic in the burst container is compared with the burst size. If the accumulated compensatory traffic is greater than or equal to the burst size, the burst is generated at a burst time $t_b$ which corresponds substantially to the time instance (0+n*(sample slot time)). It will be assumed for this example that the result of this comparison of accumulated compensatory traffic with burst size indicates that the accumulated compensatory traffic is greater than or equal to the burst size for time instance (0+n*(sample slot time)), such that the burst is generated substantially at this point in time.

At Time Instance (0+(n+1)*(Sample Slot Time)):

New burst size is determined.

New compensatory-accumulation size is determined.

An empty burst container is created having a capacity that is equal to the burst size.

Future reference burst and compensatory-accumulation sizes may be updated to reflect the new values.

The burst accumulation then proceeds in a similar manner, and whenever the burst container is filled with accumulated compensatory traffic, the corresponding burst occurs.

The foregoing traffic generation example can be generally viewed as comprising the following steps for each burst to be generated:

1. A current burst size and a compensatory-accumulation size are determined.
2. A burst container having a capacity that is equal to the burst size is created, and is initially empty.
3. Compensatory traffic is added to the burst container whenever the total traffic generated within a given sample slot time is less than the comparison level. For each such addition of compensatory traffic, the level of traffic in the burst container increases by the compensatory-accumulation size.
4. Whenever the burst container level is greater than or equal to the burst size, the burst occurs.

A given burst in this example is thus accumulated over a comparative traffic process. During the burst, the comparative traffic process is preferably halted, but such halting is not a requirement of the invention.

An example set of parameters for use in the illustrative embodiment of the invention is as follows.

1. The line speed is OC-48, or 2.488320000 Gbps.
2. The average usage is 72% or 1.791590400 Gbps. This is the mean value of generation for the comparative traffic.
3. The sample slot time is 0.000034 second, or 34 microseconds.
4. The comparison level may be on the order of the product of the comparative traffic mean value and the sample slot time, that is, 1791590400 bits/second×0.000034 second, or 60914 bits. If the comparison level is increased, for example, to 62000 bits, the comparative traffic will fall short of the level more frequently so that accumulation will occur more frequently, and the inter-arrival time of the bursts will be reduced. Similarly, if one were to use a value of 60000 bits, which is lower than the product of the mean value and the sample slot time, accumulation will occur less frequently than if the 60914 value were used.
5. The mean burst size is 5000 packets.
6. The variation in burst size is 560 packets, so that the burst size can vary from 5000+560 packets to 5000−560 packets. Each packet may have a length varying from 200 bytes to 300 bytes.
7. The mean compensatory-accumulation size is 700 packets and the associated variation is 140 packets, so that the range of compensatory-accumulation sizes is 700+140 packets to 700−140 packets.

It should be understood that these particular parameter values are provided solely by way of example. The invention does not require the use of these values or any other particular parameter values.

The combination of the comparative traffic and the traffic bursts advantageously provides improved modeling of "real-life" traffic behavior. More specifically, with regard to the present example, the traffic arrival primarily follows a Poisson distribution, with the periodic bursts tending to compensate the temporary loss in normal traffic arrival, such that a particular level of traffic flow is maintained over a longer period of time.

The present invention in the illustrative embodiment described above overcomes one or more of the drawbacks of the conventional techniques. For example, a traffic generator with an enhanced burst modeling feature in accordance with the invention provides improved efficiency and accuracy in modeling of "real-life" traffic behavior in a network-based communication system. A high degree of flexibility and user control in the burst generation process is provided. Also, the invention can be readily implemented in a practical hardware or software traffic generator. The invention allows a wide variety of burst-related processing applications, such as the benchmarking of communication systems against burst behavior, to be implemented in an efficient manner.

As mentioned previously, one or more software programs for implementing the traffic generation functionality described herein may be stored in a memory of an information processing device and executed by a processor of that device.

It should again be emphasized that the above-described embodiment is intended to be illustrative only. For example, alternative embodiments may be configured which utilize different traffic generator configurations, modeling parameters, parameter values, or processing steps than those specifically described herein.

These and numerous other alternative embodiments within the scope of the following claims will be apparent to those skilled in the art.

What is claimed is:

1. A method of generating data traffic in a traffic generator, the method comprising the steps of:

generating a first type of traffic in accordance with a given distribution; and generating a second type of traffic different than the first type of traffic, the second type of traffic comprising at least one traffic burst;

wherein a determination as to whether or not the traffic burst is generated for a given time interval is based at least in part on an amount of the first type of traffic generated over one or more previous time intervals;

wherein the step of generating the second type of traffic further comprises accumulating compensatory traffic over one or more of the time intervals for which the first type of traffic is generated, and generating the traffic burst based at least in part on the accumulated compensatory traffic; and wherein the steps are performed by at least one processing device.

2. The method of claim 1 wherein the first type of traffic comprises comparative traffic characteristic of non-burst traffic.

3. The method of claim 1 wherein the given distribution comprises a Poisson distribution.

4. The method of claim 1 wherein the given distribution comprises a Gaussian distribution.

5. The method of claim 1 wherein the step of generating the second type of traffic further comprises the step of determining, for each of the one or more time intervals, if an amount of the traffic of the first type generated during that interval is less than a comparison level, and if so adding an amount of compensatory traffic to a burst container having a capacity given by a burst size.

6. The method of claim 5 wherein the traffic burst is generated when a total amount of accumulated traffic in the burst container is greater than or equal to the burst size.

7. The method of claim 5 wherein the burst size is determined as a function of a mean burst size and a corresponding variation range.

8. The method of claim 5 wherein the amount of compensatory traffic comprises an amount of traffic given by a compensatory-accumulation size.

9. The method of claim 8 wherein the compensatory-accumulation size is determined as a function of a mean compensatory-accumulation size and a corresponding variation range.

10. The method of claim 1 wherein the one or more time intervals each comprise sample slot times.

11. The method of claim 1 wherein the step of generating the second type of traffic further comprises generating a plurality of traffic bursts, wherein a given one of the traffic bursts is generated by:

determining a current burst size and a current compensatory-accumulation size;

creating an initially-empty burst container having a capacity that is equal to the burst size;

adding compensatory traffic to the burst container whenever the total traffic of the first type generated within a given sample slot time is less than a comparison level, such that for each such addition of compensatory traffic, a level of traffic in the burst container increases by the compensatory-accumulation size; and generating the given traffic burst when the burst container level is greater than or equal to the burst size.

12. The method of claim 1 wherein the traffic of the second type comprises a plurality of traffic bursts which are generated in a manner which tends to compensate for temporary reductions in the amount of traffic of the first type so as to substantially maintain a particular level of traffic flow.

13. The method of claim 1 wherein the traffic generator comprises a hardware traffic generator.

14. The method of claim 1 wherein the traffic generator comprises a software traffic generator.

15. An apparatus for generating data traffic, the apparatus comprising an information processing device having a processor and a memory, the information processing device implementing a traffic generator operative:

to generate a first type of traffic in accordance with a given distribution; and to generate a second type of traffic different than the first type of traffic, the second type of traffic comprising at least one traffic burst;

wherein a determination as to whether or not the traffic burst is generated for a given time interval is based at least in part on an amount of the first type of traffic generated over one or more previous time intervals; and wherein the second type of traffic is generated by accumulating compensatory traffic over one or more of the time intervals for which the first type of traffic is generated, and generating the traffic burst based at least in part on the accumulated compensatory traffic.

16. The apparatus of claim 15 wherein generation of the second type of traffic includes determining, for each of the one or more time intervals, if an amount of the traffic of the first type generated during that interval is less than a comparison level, and if so adding an amount of compensatory traffic to a burst container having a capacity given by a burst size.

17. The apparatus of claim 15 wherein the traffic of the second type comprises a plurality of traffic bursts which are generated in a manner which tends to compensate for temporary reductions in the amount of traffic of the first type so as to substantially maintain a particular level of traffic flow.

18. An article of manufacture comprising a storage medium containing one or more software programs for use in generating data traffic in a traffic generator, wherein the one or more software programs when executed implement the steps of:

generating a first type of traffic in accordance with a given distribution; and generating a second type of traffic different than the first type of traffic, the second type of traffic comprising at least one traffic burst;

wherein a determination as to whether or not the traffic burst is generated for a given time interval is based at least in part on an amount of the first type of traffic generated over one or more previous time intervals; and wherein the step of generating the second type of traffic further comprises accumulating compensatory traffic over one or more of the time intervals for which the first type of traffic is generated, and generating the traffic burst based at least in part on the accumulated compensatory traffic.

19. The article of manufacture of claim 18 wherein the step of generating the second type of traffic further comprises the step of determining, for each of the one or more time intervals, if an amount of the traffic of the first type generated during that interval is less than a comparison level, and if so adding an amount of compensatory traffic to a burst container having a capacity given by a burst size.

20. The article of manufacture of claim 18 wherein the traffic of the second type comprises a plurality of traffic bursts which are generated in a manner which tends to compensate for temporary reductions in the amount of traffic of the first type so as to substantially maintain a particular level of traffic flow.

* * * * *